United States Patent [19]
Yu

[11] 3,943,911
[45] Mar. 16, 1976

[54] SOLAR HEAT COLLECTOR

[76] Inventor: Ying-Nien Yu, 1018 Oxford Ave., Marina Del Rey, Calif. 90291

[22] Filed: May 31, 1974

[21] Appl. No.: 474,934

[52] U.S. Cl. ................................................. 126/271
[51] Int. Cl.² ........................................... F24J 3/02
[58] Field of Search ............ 126/271, 270; 237/1 A

[56] References Cited
UNITED STATES PATENTS

| | | | |
|---|---|---|---|
| 1,888,620 | 11/1932 | Clark | 126/271 |
| 3,077,190 | 2/1963 | Allen | 126/271 |
| 3,146,774 | 9/1964 | Yellot | 126/271 |
| 3,369,539 | 2/1968 | Thomason | 126/271 |
| 3,399,664 | 9/1968 | Suhay | 126/271 |
| 3,620,206 | 11/1971 | Harris | 126/271 |

Primary Examiner—Kenneth W. Sprague
Assistant Examiner—James C. Yeung
Attorney, Agent, or Firm—William W. Haefliger

[57] ABSTRACT

A solar heat exchanger comprises:

a. a base and an extended surface thereon for facing frontwardly toward the sun, b. means communicating with said surface to conduct liquid to flow in dispersed condition adjacent said surface, and c. a sheet overlying said surface and spaced therefrom sufficiently closely to cooperate therewith for filming the flowing liquid, said sheet adapted to receive solar radiation for promoting heat transfer to the filmed and flowing liquid.

9 Claims, 3 Drawing Figures

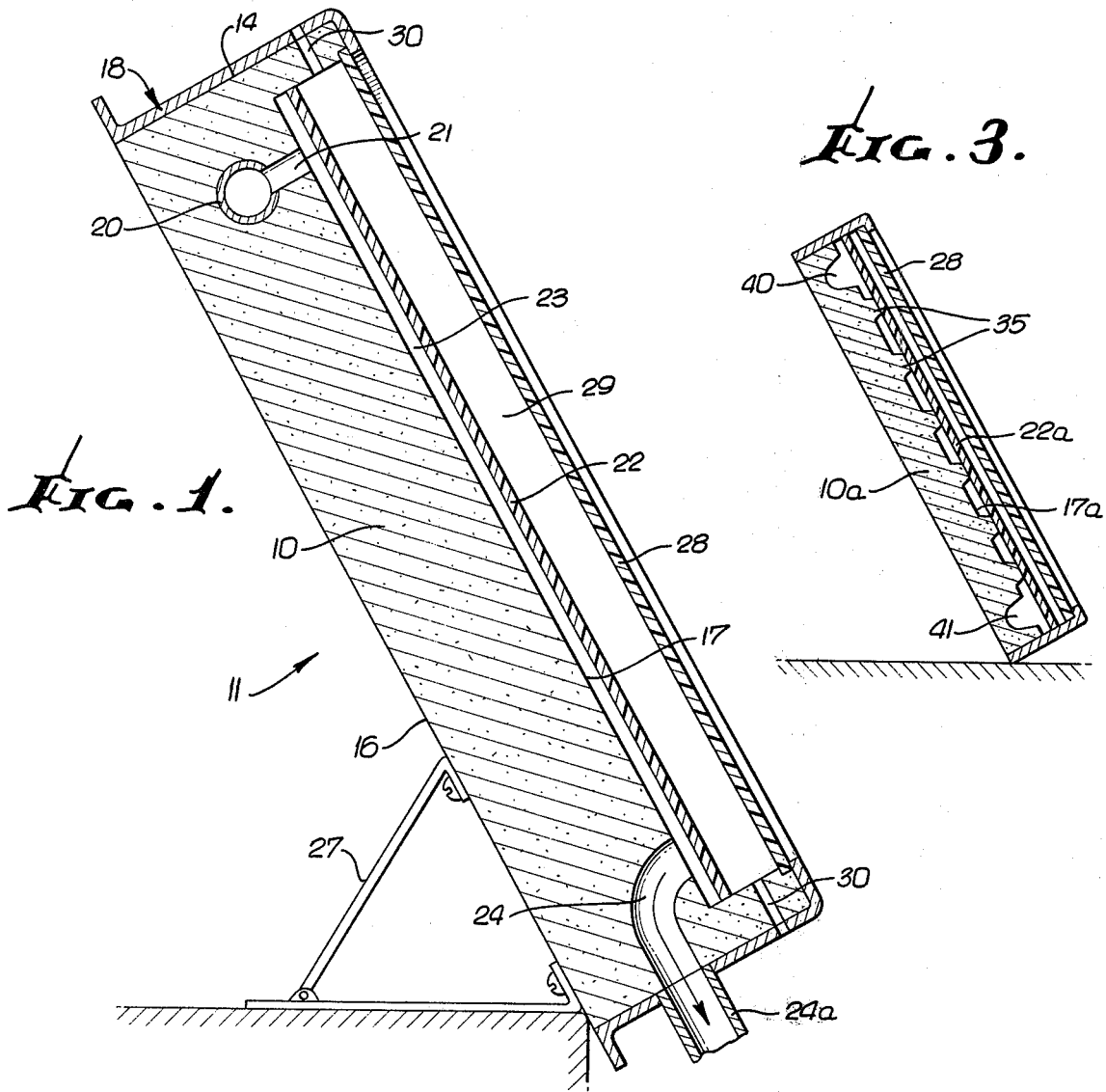
Fig. 1.
Fig. 3.
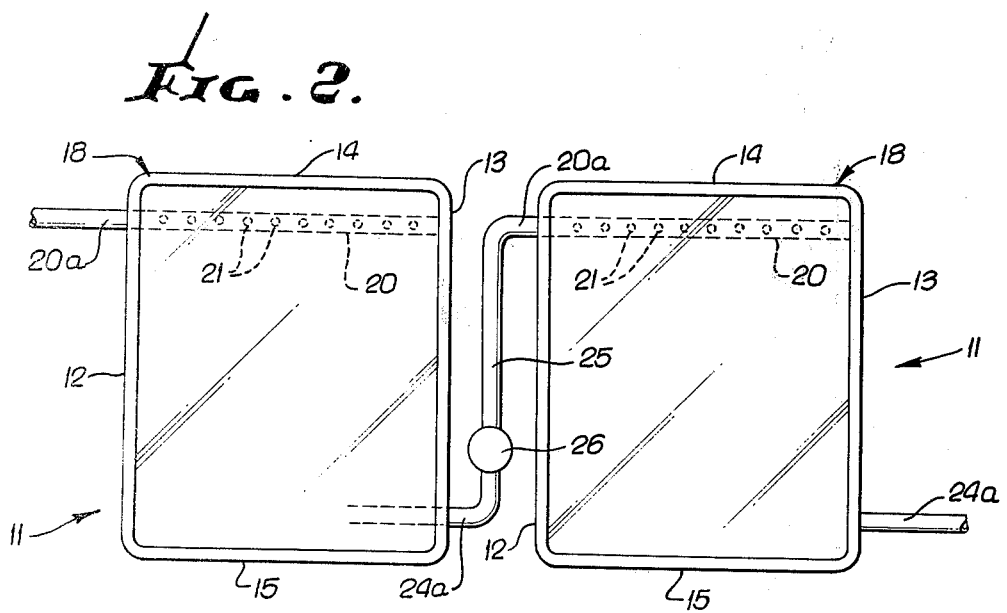
Fig. 2.

SOLAR HEAT COLLECTOR

BACKGROUND OF THE INVENTION

This invention relates generally to solar heat collection, and more particularly concerns a solar heat collector of simple and inexpensive design and mode of operation, wherein solar heat is transferred to flowing liquid.

In the past, solar heat collection has involved relatively complex, expensive equipment. Where heat was transferred to liquid the amount of solar heat transferred to the liquid per unit of energy input to move the liquid was undesirably low, resulting in relatively low efficiency. In particular, no way was known to provide the simple, efficient, lightweight, modular solar heat collector having the wide range of utility as now afforded by the present invention.

SUMMARY OF THE INVENTION

It is a major object of the invention to provide a solar heat collector overcoming the problems and shortcomings referred to. Basically, the collector comprises a base with an extended surface thereon to face frontwardly toward the sun; means communicating with that surface to conduct liquid to flow in dispersed condition adjacent that surface; and a sheet overlying the surface and spaced from it sufficiently to cooperate in filming the flowing liquid, the sheet adapted to receive solar radiation for promoting heat transfer to the filmed and flowing liquid. In one example, the sheet is translucent and the surface is dark or darkened to absorb solar radiation transmitted through the sheet and through the liquid film, for converting the absorbed radiation to heat to be transmitted to the filmed and flowing liquid. Further, a translucent panel may overlie the sheet in spaced relation thereto for producing a so-called "greenhouse" effect, to minimize convective heat loss. In another example, the sheet itself may incorporate, or constitute, a dark or darkened radiation absorber to produce heat conducted to the filmed and flowing liquid.

Additional objects include the provision of a base consisting of plastic material, the sheet also consisting of plastic material; the provision of metallic base and sheet elements; the provision of ducting communicating with the base to receive the draining liquid; the provision of multiple modular solar heat collector units as described and their connection in tandem or series; and the provision of means to cause the draining liquid to flow tortuously, as will be seen.

These and other objects and advantages of the invention, as well as the details of an illustrative embodiment, will be more fully understood from the following description and drawings, in which:

DRAWING DESCRIPTION

FIG. 1 is a side elevation, in section, showing a solar heat collector embodying the invention;

FIG. 2 is a frontal view showing a pair of heat collectors connected in series; and FIG. 3 is a side elevation, in section, showing a modified collector.

DETAILED DESCRIPTION

The invention basically comprises a solar heat exchanger having a base and an extended surface thereon for facing frontwardly toward the sun; means communicating with that surface to conduct liquid to flow adjacent that surface, as by gravity flow; and a sheet overlying that surface and spaced therefrom to cooperate with the surface for filming the flowing liquid, the sheet adapted to receive solar radiation for promoting heat transfer to the flowing liquid. In FIGS. 1 and 2 the base 10 of the collector 11 typically consists of molded plastic material, as for example polyurethane or ABS, which is lightweight and relatively inexpensive. The base, of rectangular outline, has opposite sides 12 and 13, top 14, bottom 15, and back and front surfaces 16 and 17. If desired, a lightweight metallic frame 18 may be provided to extend about the base, as seen in FIG. 1. Further, the base may itself consist of lightweight metallic material, particularly at surface 17.

Also in FIGS. 1 and 2, the means to conduct fluid to flow adjacent surface 17, which is recessed into the base, may comprise a duct 20 extending horizontally laterally in the base beneath the level of surface 17, and small openings 21 communicating between duct 20 and the upper extent of surface 17. Duct 20 may consist of plastic pipe molded into the base, such pipe projecting at 20a in FIG. 2.

The sheet 22 in FIG. 1 consists of thin plastic material, as for example MYLAR, which is transparent, or at least translucent, to transmit sun light to impinge on surface 17. The latter is dark to absorb solar radiation, and may be covered with black paint for example; as a result, the absorbed radiation is converted to heat which is transferred by conduction to the water or liquid filming at 23 over and draining downwardly along the surface in the small gap between the surface 17 and sheet 22. Sheet 22 may be peripherally retained to the base in any suitable manner.

The surface 17 is typically tilted downwardly at an angle sufficient to promote downward drainage of the filming liquid 23 for reception and outward drainage as via a duct 24 in the base. FIG. 2 shows a modified duct 24a extending laterally from the lower interior of the base. That duct may be connected with the inlet 20a of an adjacent and like collector 11, so that the liquid may be heated further. If desired, a pump may be utilized in the connecting pipe stretch 25, as indicated at 26. FIG. 1 shows a support 27 extending from the rear side of the base to the ground level to retain the base in angled position with surface 17 directed toward impinging sunlight.

A further feature shown in FIG. 1 comprises a translucent or transparent panel 28 outwardly spaced from sheet 22 and extending generally parallel thereto. Panel 28, as for example consisting of plastic or glass, protects and confines space 29 containing air trapped between the sheet and panel, producing a so-called "greenhouse" effect. The latter is characterized by entrapment of heat in space 29 enhancing the heat collection and transfer efficiency of the device. Vents 30 in the base may release excess heat in space 29 so as to avoid melting of the plastic materials of which the collector unit is made.

If desired, the sheet 22 may itself be darkened so as to absorb solar radiation and transmit heat to the liquid filming and draining at 23. It should be observed that sheet 22 is flexible and tends to drape against surface 17 in the absence of liquid flow as described. Alternatively, the sheet 22 may be darkened and consist of metallic material closely spaced to surface 17, one example being aluminum painted a dark color on both sides.

In FIG. 3, the modified base 10a has button-like protuberances 35 molded or formed integrally therewith to stand out from water filming surface 17a. Sheet 22a then drapes or extends over the protuberances 35 for filming the liquid draining downward adjacent and between the protuberances. The latter may be staggered over the surface 17a to cause the liquid to flow tortuously, for enhanced heat transfer. Water supply and collection channels appear at 40 and 41.

In FIG. 2, inlet ducts 20a in successive collectors may be directly interconnected, and outlet ducts 24a may also be directly connected, so that the collectors are connected in parallel rather than series.

The surface of base 10 facing sheet 22 may consist of a thin metallic skin, such as aluminum.

I claim:

1. In a solar heat exchanger, the combination comprising
   a. a base and an extended metallic surface thereon for facing frontwardly toward the sun, the base including plastic material at the rear side of said metallic surface,
   b. means communicating through said plastic material and with said surface to conduct liquid to flow in dispersed condition adjacent the front side of said surface, and
   c. a sheet overlying said surface and spaced therefrom sufficiently closely to cooperate therewith for filming the flowing liquid, said sheet adapted to receive solar radiation for promoting heat transfer to the filmed and flowing liquid,
   d. a translucent panel overlying said sheet and spaced therefrom, and
   e. said base having a portion extending at the peripheries of said panel and sheet to enclose said space therebetween, there being vent means in said base portion to release heat from said enclosed space.

2. The heat exchanger of claim 1 wherein the sheet is translucent and said surface is relatively dark to absorb impinging solar radiation transmitted through the sheet and liquid film for converting the absorbed radiation to heat to be transmitted to the filmed and flowing liquid.

3. The heat exchanger of claim 2 wherein said sheet consists of plastic material.

4. The heat exchanger of claim 1 wherein said sheet includes a darkened layer to absorb impinging solar radiation for conversion to heat to be transmitted to the filmed and flowing liquid.

5. The heat exchanger of claim 4 wherein said sheet consists of metallic material.

6. The heat exchanger of claim 1 including ducting extending through said plastic material and communicating with said surface to receive and conduct liquid that has been heated in flowing adjacent said surface.

7. The heat exchanger of claim 6 wherein said surface is tilted to extend downwardly at an angle relative to vertical to effect downward gravity flow of said liquid adjacent said surface.

8. Multiple heat exchanger as defined in claim 6 with said ducting associated with one exchanger connected with said means to conduct liquid to another heat exchanger.

9. The heat exchanger of claim 1 wherein there are protuberances extending between the sheet and said surface to cause the liquid to drain in a tortuous flow pattern.

* * * * *